United States Patent [19]
Larson et al.

[11] Patent Number: 6,014,612
[45] Date of Patent: Jan. 11, 2000

[54] REMOTE DIAGNOSTICS IN A PROCESS CONTROL NETWORK HAVING DISTRIBUTED CONTROL FUNCTIONS

[75] Inventors: Brent H. Larson; Harry A. Burns; Larry K. Brown, all of Marshalltown, Iowa

[73] Assignee: Fisher Controls International, Inc., Clayton, Mo.

[21] Appl. No.: 08/944,088

[22] Filed: Oct. 2, 1997

[51] Int. Cl.[7] ............................. G06F 11/30; G06F 13/14; G21C 17/00; G05B 11/01
[52] U.S. Cl. ......................... 702/183; 702/182; 702/186; 364/140.01; 395/200.53; 395/200.55; 395/289
[58] Field of Search ..................................... 702/183, 188, 702/182, 184, 186; 364/138, 140.01; 709/223, 224, 225, 226, 253; 710/107, 109, 126

[56] References Cited

U.S. PATENT DOCUMENTS

| | | | |
|---|---|---|---|
| 4,271,505 | 6/1981 | Menot et al. | 370/85 |
| 4,627,045 | 12/1986 | Olson et al. | 370/16 |
| 4,680,581 | 7/1987 | Kozlik et al. | 340/825.06 |
| 4,691,328 | 9/1987 | Sterling, Jr. et al. | 375/36 |
| 4,831,558 | 5/1989 | Shoup et al. | 364/550 |
| 4,872,165 | 10/1989 | Mori et al. | 371/11.2 |
| 4,918,690 | 4/1990 | Markkula, Jr. et al. | 370/94 |
| 4,955,305 | 9/1990 | Garnier et al. | 112/121.11 |
| 4,974,625 | 12/1990 | Paullus et al. | 137/85 |
| 4,976,144 | 12/1990 | Fitzgerald | 73/168 |

(List continued on next page.)

FOREIGN PATENT DOCUMENTS

| | | |
|---|---|---|
| 0 450 116 A1 | 4/1990 | European Pat. Off. . |
| 0 449 458 A1 | 10/1991 | European Pat. Off. . |
| 0 562 333 A2 | 9/1993 | European Pat. Off. . |
| 0 575 150 A2 | 12/1993 | European Pat. Off. . |
| 0 604 091 A2 | 6/1994 | European Pat. Off. . |
| 195 10 466 A1 | 10/1996 | Germany . |
| WO 92/04676 | 3/1992 | WIPO . |
| WO 94/22776 | 10/1994 | WIPO . |
| WO 96/12993 | 5/1996 | WIPO . |

OTHER PUBLICATIONS

Fieldbus Foundation Manual, Communications Technical Specification and User Layer Technical Specification and User Layer Technical Specification, 1994–1997, including Fieldbus Message Specification FF–870–1.1; Physical Layer Conformance Testing FF–830 FS 1.0; Device Description Language FF–900–1.0; Function Blocks (Part I) FF–890–1.2;Fieldbus Access Sublayer FF–875–1.1; Function Blocks (Part 2) FF–891–1.2; Data Link Protocol FF–822.1.1; Communication Profile FF–940–1.0; Transducer Blocks (Part I) FF–902 Rev PS 2.0; Transducer Blocks (Part 2) FF–903–Rev PS 2.0; Data Link Services FF–821–1.0; 31.25 kbit/s Physical Layer Profile FF–816–1.0; Network Management FF–801–1.1; and System Architecture FF–800–1.0.

(List continued on next page.)

*Primary Examiner*—John Barlow
*Assistant Examiner*—Keadrick P. Patterson
*Attorney, Agent, or Firm*—Marshall, O'Toole, Gerstein, Murray & Borun

[57] ABSTRACT

A diagnostic system is adapted to perform device and process diagnostics in a process control network having a plurality of process control devices communicatively linked over a bus, wherein each of the devices is capable of preforming a process control function and of communicating over the bus using scheduled periodic communications. The diagnostic system is disposed in a first one of the devices and includes a signal generator that produces a diagnostic control signal, a communicator configured to deliver the diagnostic control signal to a second one of the devices using scheduled periodic communications, and an output signal receiver adapted to receive an output signal developed by the second device in response to the diagnostic control signal. The diagnostic system may use the received output signal to perform diagnostics or may send this signal to a host device for diagnostic analysis.

28 Claims, 6 Drawing Sheets

U.S. PATENT DOCUMENTS

| | | | |
|---|---|---|---|
| 5,014,185 | 5/1991 | Saito et al. | 364/188 |
| 5,023,869 | 6/1991 | Grover et al. | 370/84 |
| 5,109,692 | 5/1992 | Fitzgerald | 73/168 |
| 5,146,401 | 9/1992 | Bansal et al. | 364/138 |
| 5,148,433 | 9/1992 | Johnson et al. | 371/11.3 |
| 5,193,189 | 3/1993 | Flood et al. | 395/650 |
| 5,197,328 | 3/1993 | Fitzgerald | 73/168 |
| 5,402,367 | 3/1995 | Sullivan et al. | 364/578 |
| 5,404,524 | 4/1995 | Celi, Jr. | 395/700 |
| 5,434,774 | 7/1995 | Seberger et al. | 364/172 |
| 5,439,021 | 8/1995 | Burlage et al. | 137/84 |
| 5,451,923 | 9/1995 | Seberger et al. | 340/310.06 |
| 5,469,150 | 11/1995 | Sitte | 340/825.07 |
| 5,469,548 | 11/1995 | Callison et al. | 395/441 |
| 5,485,455 | 1/1996 | Dobbins et al. | 370/60 |
| 5,530,643 | 6/1996 | Hodorowski | 364/191 |
| 5,555,195 | 9/1996 | Jensen et al. | 364/551.01 |
| 5,558,115 | 9/1996 | Lenz et al. | 137/86 |
| 5,573,032 | 11/1996 | Lenz et al. | 137/486 |
| 5,592,622 | 1/1997 | Isfeld et al. | 395/200.02 |
| 5,621,662 | 4/1997 | Humphries et al. | 364/550 |
| 5,631,825 | 5/1997 | van Weele et al. | 364/188 |
| 5,650,777 | 7/1997 | Westfield et al. | 340/870.11 |
| 5,684,451 | 11/1997 | Seberger et al. | 340/310.06 |
| 5,768,119 | 6/1998 | Havekost et al. | 364/133 |
| 5,828,851 | 10/1998 | Nixon et al. | 395/285 |

OTHER PUBLICATIONS

"Fieldvue® ValveLink™ Series VL2000 Software," Fisher–Rosemount Bulletin 62.1 VL2000, pp. 1–6 (Nov. 1995).

"Fieldvue® VL2000 Series Software User Guide," Fisher Controls, Version 2.0 (Jun. 1996).

"Fieldvue® Digital Valve Controller Type DVC5000 Series," Fisher–Rosemount Bulletin 62.1:DVC5000, pp. 1–12 (Jun. 1994).

"Fieldvue™, Digital Valve Controller DVC5000 Series Remotely Accessible Information," Fisher Controls Bulletin 62.1:DVC5000(S1), pp. 1–2 (Jun. 1994).

"Fieldvue™ Digital Valve Controller Type DVC5000 Series," Fisher Controls Form 5335, pp. 1–35 and Errata Sheet (Jun. 1994).

Fisher–Rosemount Systems, "Fieldbus Technical Overview Understanding Foundation™ Fieldbus Technology," 27 pages, 1997.

"Foundation™ Specification, Function Block Application Process," Part 3, 155 pages, 1995–1996.

Fieldbus Foundation™, "Technical Overview," FD–043 Revision 1.0, 29 pages, 1996.

PCT/US 98/15772 *International Search Report* dated Dec. 4, 1998.

Fromberger, "Feldbusfähige, intelligente Sensoren," Messen und Prüfen, vol. 27, No. 7, pp. 332, 334–340, 1991.

Watt, "The Double–Distributed Control Network," Thesis submitted to Thayer School of Engineers, Dartmouth College, Hanover, N.H. (Jan. 1984).

Zielinski et al., "Asset Management Using Fieldbus," Fisher–Rosemont Systems, Inc, pp. 1–14 (1997).

"Advanced Systems Simplify Control," Machine Design, vol. 68, No. 12, pp. 118–120 (Jul. 11, 1996).

Black, "Combining Lan Technology with Smart Sensors to Provide Predictive Maintenance, Diagnostics and Alarm Systems," Proceedings of the Industrial Computing Conference, Chicago, vol. 3, Sep. 19, 1993, Industrial Computing Society/Instrument of America, pp. 345–354 (1993).

Zielinski, "Issues for Digital Field Instrument Networks," Intech, pp. 92–94 (1989).

REMOTE DIAGNOSTICS IN A PROCESS CONTROL NETWORK HAVING DISTRIBUTED CONTROL FUNCTIONS

FIELD OF THE INVENTION

The present invention relates generally to process control networks and, more specifically, to a method of and an apparatus for performing remote device and process diagnostics in a process control network having distributed control functions.

DESCRIPTION OF THE RELATED ART

Large processes such as chemical, petroleum, and other manufacturing and refining processes include numerous field devices disposed at various locations to measure and control parameters of a process to thereby effect control of the process. These field devices may be, for example, sensors such as temperature, pressure, and flow rate sensors as well as control elements such as valves and switches. Historically, the process control industry used manual operations like manually reading level and pressure gauges, turning valve wheels, etc., to operate the measurement and control field devices within a process. Beginning in the 20th century, the process control industry began using local pneumatic control, in which local pneumatic controllers, transmitters, and valve positioners were placed at various locations within a process plant to effect control of certain plant locations. With the emergence of the microprocessor-based distributed control system (DCS) in the 1970's, distributed electronic process control became prevalent in the process control industry.

As is known, a DCS includes an analog or a digital computer, such as a programmable logic controller, connected to numerous electronic monitoring and control devices, such as electronic sensors, transmitters, current-to-pressure transducers, valve positioners, etc. located throughout a process. The DCS computer stores and implements a centralized and, frequently, complex control scheme to effect measurement and control of devices within the process to thereby control process parameters according to some overall control scheme. Usually, however, the control scheme implemented by a DCS is proprietary to the DCS controller manufacturer which, in turn, makes the DCS difficult and expensive to expand, upgrade, reprogram, and service because the DCS provider must become involved in an integral way to perform any of these activities. Furthermore, the equipment that can be used by or connected within any particular DCS may be limited due to the proprietary nature of DCS controller and the fact that a DCS controller provider may not support certain devices or functions of devices manufactured by other vendors.

To overcome some of the problems inherent in the use of proprietary DCSs, the process control industry has developed a number of standard, open communication protocols including, for example, the HART®, PROFIBUS®, WORLDFIP®, Device-Net®, and CAN protocols, which enable field devices made by different manufacturers to be used together within the same process control network. In fact, any field device that conforms to one of these protocols can be used within a process to communicate with and to be controlled by a DCS controller or other controller that supports the protocol, even if that field device is made by a different manufacturer than the manufacturer of the DCS controller.

Moreover, there is now a move within the process control industry to decentralize process control and, thereby, simplify DCS controllers or eliminate the need for DCS controllers to a large extent. Decentralized control is obtained by having field mounted process control devices, such as valve positioners, transmitters, etc. perform one or more process control functions and by then communicating data across a bus structure for use by other process control devices in performing other control functions. To implement these control functions, each process control device includes a microprocessor having the capability to perform a control function as well as the ability to communicate with other process control devices using a standard and open communication protocol. In this manner, field devices made by different manufacturers can be interconnected within a process control network to communicate with one another and to perform one or more process control functions forming a control loop without the intervention of a DCS controller. The all-digital, two-wire bus protocol now being promulgated by the Fieldbus Foundation, known as the FOUNDATION™ Fieldbus (hereinafter "Fieldbus") protocol is one open communication protocol that allows devices made by different manufacturers to interoperate and communicate with one another via a standard bus to effect decentralized control within a process.

As noted above, the decentralization of process control functions simplifies and, in some cases, eliminates the necessity of a proprietary DCS controller which, in turn, reduces the need of a process operator to rely on the manufacturer of the DCS controller to change or upgrade a control scheme implemented by the DCS controller. However, decentralized control also makes it more difficult to perform diagnostics, such as process diagnostics, which have been typically performed by a DCS controller.

In a standard DCS environment, a computer (such as a personal computer) is coupled to the network and performs device diagnostics on, for example, a valve or a positioner/valve combination, by sending a diagnostic control signal to the positioner, which then forces the valve through a test stroke or test cycle associated with the diagnostic control signal. During this time, the computer measures outputs of the positioner and/or the valve, such as changes in valve position, that occur in response to the diagnostic control signal and, thereafter, performs analysis on the measured outputs to determine the operating condition of the valve or the positioner/valve device. A standard DCS controller or other computer device generally performs process diagnostics by sending a diagnostic control signal to a device, such as a positioner, to cause a controlled change within a process, measuring one or more process parameters at that or other locations within the process, and then analyzing the measured process parameters to determine the operating condition of the process.

In a standard DCS environment, diagnostics can be performed without rewiring or reconfiguring the system because the DCS controller (or other computer) is already configured to control the set points (or other inputs) of the various devices within the process and to measure device outputs and other process parameters to implement a control strategy associated with the normal operation of the process. As a result, performing diagnostics in a standard DCS environment is really a matter of using the DCS controller or a specially configured computer in a slightly different way to control one or more devices within the process and using the DCS controller or computer to read process or device parameters, as it is configured to do. As a result, in standard DCS environments, diagnostic routines can be stored in and used by a centralized DCS controller or other computer to perform device or process diagnostics and these diagnostic routines can be used without reconfiguring the process control network in any significant manner. Unfortunately, because of the centralized nature of these diagnostic routines, they do not provide much detailed information about individual field devices.

However, in a process control network having distributed control functions, a centralized system controller, to the extent it exists, is not configured to individually control all of the field devices within a process and is not configured to receive data pertaining to all of the appropriate device or process parameters necessary for performing device and process diagnostics. Instead, different process control loops of the control strategy are implemented by a number of communicatively linked devices located at distributed places within the process control network. Typically, these devices are configured to use scheduled periodic communications to communicate data necessary for implementation of the specific control functions associated with a process control loop and to communicate other data (such as set point changes) using aperiodic or asynchronous communications. As a result, in a process control network having distributed control functions implemented using scheduled periodic communications, a host is unable to send a strictly deterministic diagnostic control signal to a process control device while the system is configured to implement the normal control strategy because the host must use asynchronous communications to deliver the diagnostic control signal and, therefore, has no way of controlling the precise time that the diagnostic control signal (or different parts thereof) arrive at the device being tested or controlled. In fact, using asynchronous communications, a host has no way of knowing when the diagnostic control signal (or any particular part thereof) actually arrives at the input of the device being controlled. As a result, for a host to send a deterministic diagnostic control signal to a device in a process control network having distributed control functions, the control configuration of the network must be reconfigured, which requires taking the process off-line. Alternatively, some devices within a process control network having distributed control functions are able to perform self-diagnostics and, therefore, do not need to be controlled by a host to perform diagnostics. However, these devices are typically more expensive and are unable to perform diagnostics on other devices.

Thus, to perform device diagnostics in a process control network having distributed control functions, a process operator must purchase a device with self-diagnostics for every location at which diagnostics are to be performed, which is expensive, or the process operator must reconfigure the communication interconnections of the network to allow a host to use scheduled communications to send a diagnostic control signal to a device under test whenever a device or process diagnostic is to be performed, which is undesirable because it requires the control strategy of the network to be reconfigured.

Moreover, it is very difficult for a host to perform accurate process diagnostics in a process control network having distributed control functions because, as noted above, the normal control strategy of the process must be reconfigured to allow the host to deterministically control a device which, in turn, changes the manner in which the measured process variables are produced. In other words, when a process control scheme is reconfigured to allow a host to control a device in a deterministic manner, the process variables measured during the diagnostic are no longer indicative of the process under normal operation but, instead, are only indicative of the process under the diagnostic control scheme. As a result, the conclusions of the process diagnostic may not be indicative of the performance of the process during normal operation of the process.

SUMMARY OF THE INVENTION

The present invention is directed to a method of and a device for performing device and process diagnostics on or using another device within a process control network having distributed control functions and to a method of and a device for performing process diagnostics while a process is being controlled under essentially the same control strategy as that implemented during normal operation of the process. The method and device of the present invention can be used by a process maintenance person to perform device diagnostics on a device that does not have self-diagnostics features which, in turn, allows the process maintenance person to use less expensive devices at many locations within a process control network. Moreover, the method and device of the present invention provide device and process diagnostic capabilities that can be implemented in a process control network without affecting the control strategy or the behavior of that process control network.

According to one aspect of the present invention, a diagnostic system for use in a process control network having a plurality of devices communicatively linked over a bus is disposed in a first one of the devices and includes a signal generator that generates a diagnostic control signal, a communicator that delivers the diagnostic control signal to an input of a second one of the devices using scheduled periodic communications, and a signal receiver that receives an output signal developed by another device, such as the second device, in response to the diagnostic control signal.

The diagnostic system may include a process signal receiver adapted to receive one or more process signals from other process control devices and a storage unit that stores the one or more process signals, the received output signal, and/or the diagnostic control signal. The diagnostic system may deliver the stored process, output, and/or control signals to a third one of the devices capable of performing diagnostic analysis activities using the stored process, output, and/or control signals after a process or a device diagnostic has been run.

Moreover, the diagnostic system may include a control signal input adapted to receive a process control signal developed by a fourth one of the devices and a switch coupled to the control signal input and to the signal generator that delivers one of the process control signal or the diagnostic control signal to the second device. In this case, a feedback unit within the diagnostic system delivers the received output signal to the fourth device for use by the fourth device in creating the process control signal.

When the device receiving the feedback signal, (i.e., the fourth device) includes a control function that is capable of operating in different modes, the diagnostic system preferably includes a mode handling unit that at least indirectly controls the mode of the control function within the fourth device while sending the diagnostic control signal to the second device.

According to another aspect of the present invention, a diagnostic function block is provided for use in a process control network having a plurality of devices communicatively coupled to a bus, wherein each of the devices includes one or more function blocks capable of performing an input function, an output function, or a control function within the process control network and wherein each of the devices is capable of communicating on the bus using scheduled periodic communications. The diagnostic function block according to the present invention includes a signal generator that generates a diagnostic control signal, a communicator configured to communicate the diagnostic control signal to a second function block within a different process control device using the scheduled periodic communications, and a signal receiver that receives an output signal developed by another function block, such as the second function block, in response to the diagnostic control signal.

According to a still further aspect of the present invention, a method of performing diagnostics is provided for use in a process control network having a plurality of devices communicatively linked on a bus, wherein each of the devices includes one or more function blocks capable of performing a process control function within the process control network and capable of communicating on the bus using scheduled periodic communications. The diagnostic method according to the present invention includes the steps of connecting a first device, having a diagnostic function block that generates a diagnostic control signal therein, to the bus of the process control network, communicatively linking an output of the diagnostic function block to a second function block in a second device using the scheduled periodic communications, and communicatively linking an input of the diagnostic function block to an output of another function block, such as the second function block, to receive output signals developed by the another function block in response to the diagnostic control signal. The method also includes the step of sending the diagnostic control signal to the second function block using the scheduled periodic communications to thereby control operation of the second function block in accordance with the diagnostic control signal.

DESCRIPTION OF THE PREFERRED EMBODIMENTS

While the remote diagnostics of the present invention are described in detail in conjunction with a process control network that implements process control functions in a decentralized or distributed manner using a set of Fieldbus devices, it should be noted that the remote diagnostics of the present invention can be used with process control networks that perform distributed control functions using other types of field devices and communication protocols, including protocols that rely on other than two-wire buses and protocols that support analog and digital communications. Thus, for example, the remote diagnostics of the present invention can be used in any process control network that performs distributed control functions even if this process control network uses the HART, PROFIBUS, etc. communication protocols or any other communication protocols that now exist or that may be developed in the future.

Before discussing the details of the remote diagnostics of the present invention, a general description of the Fieldbus protocol, field devices configured according to this protocol, and the way in which communication occurs in a process control network that uses the Fieldbus protocol will be provided. However, it should be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Tex. In particular, the Fieldbus protocol, and the manner of communicating with and storing data in devices using the Fieldbus protocol, is described in detail in the manuals entitled Communications Technical Specification and User Layer Technical Specification from the Fieldbus Foundation, which are hereby incorporated by reference in their entirety herein.

The Fieldbus protocol is an all-digital, serial, two-way communication protocol that provides a standardized physical interface to a two-wire loop or bus interconnecting "field" equipment such as sensors, actuators, controllers, valves, etc. located in an instrumentation or process control environment of, for example, a factory or a plant. The Fieldbus protocol provides, in effect, a local area network for field instruments (field devices) within a process, which enables these field devices to perform control functions at locations distributed throughout a process facility and to communicate with one another before and after the performance of these control functions to implement an overall control strategy. Because the Fieldbus protocol enables control functions to be distributed throughout a process control network, it reduces the workload of, or entirely eliminates the necessity of the centralized process controller typically associated with a DCS.

Figure 1:
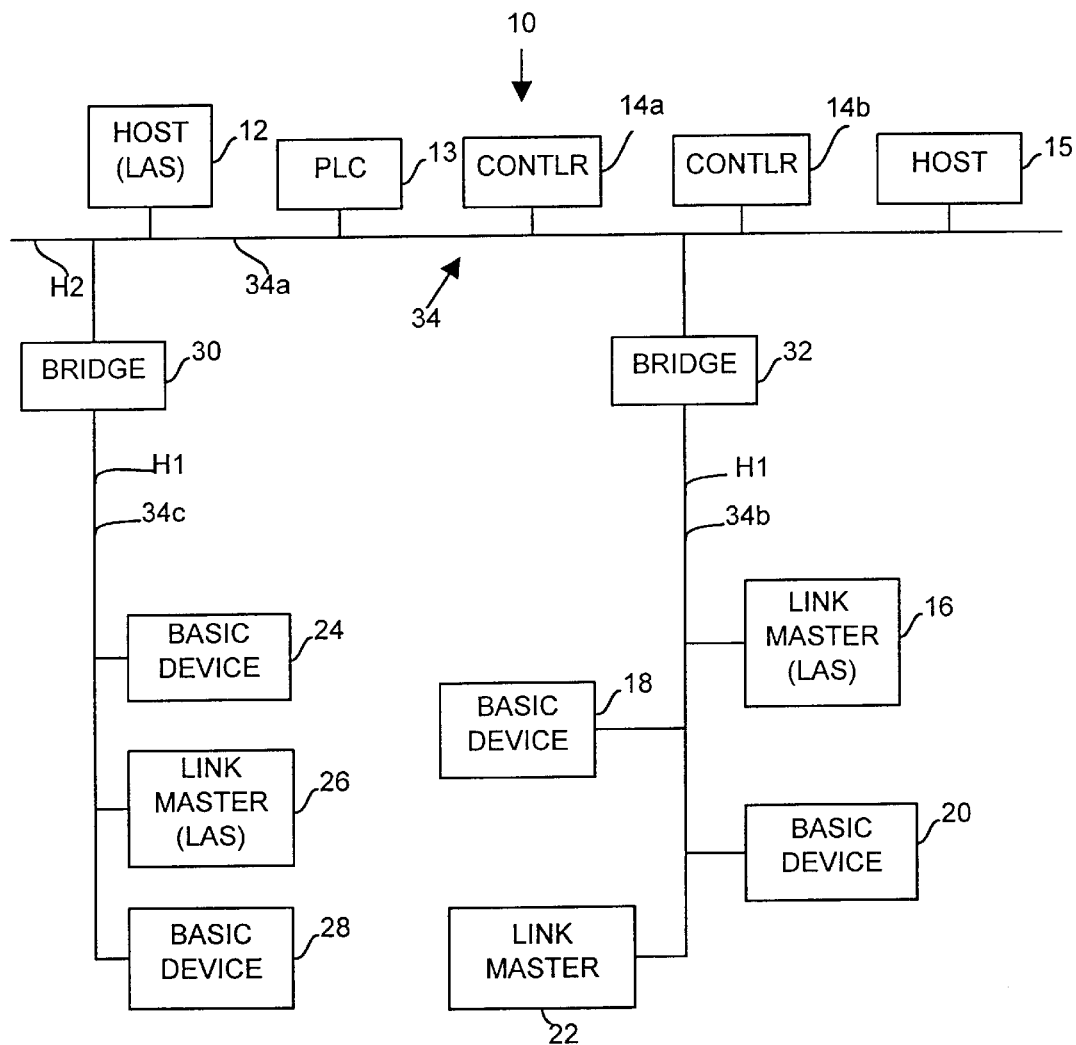
FIG. 1 is a schematic block diagram of an example process control network using the Fieldbus protocol.

Referring to FIG. 1, a process control network 10 using the Fieldbus protocol may include a host 12 connected to a number of other devices such as a program logic controller (PLC) 13, a number of controllers 14a and 14b, another host device 15 and a set of field devices 16, 18, 20, 22, 24, 26, 28, 30, and 32 via a two-wire Fieldbus loop or bus 34. The bus 34 includes different sections or segments, 34a, 34b, and 34c which are separated by bridge devices 30 and 32. Each of the sections 34a, 34b, and 34c interconnects a subset of the devices attached to the bus 34 to enable communications between the devices in a manner described hereinafter. Of course, the network of FIG. 1 is illustrative only, there being many other ways in which a process control network may be configured using the Fieldbus protocol. Typically, a configurer is located in one of the devices, such as the host 12, and is responsible for setting up or configuring each of the devices (which are "smart" devices in that they each include a microprocessor capable of performing communication and, in some cases, control functions) as well as recognizing when new field devices are connected to the bus 34, when field devices are removed from the bus 34, recognizing data generated by the field devices 16–32, and interfacing with one or more user terminals, which may be located in the host 12 or in any other device connected to the host 12 in any manner.

The bus 34 supports or allows two-way, purely digital communication and may also provide a power signal to any or all of the devices connected thereto, such as the field devices 16–32. Alternatively, any or all of the devices 12–32 may have their own power supplies or may be connected to external power supplies via separate wires (not shown). While the devices 12–32 are illustrated in FIG. 1 as being connected to the bus 34 in a standard bus-type connection, in which multiple devices are connected to the same pair of wires making up the bus segments 34a, 34b, and 34c, the Fieldbus protocol allows other device/wire topologies including point-to-point connections, in which each device is connected to a controller or a host via a separate two-wire pair (similar to typical 4–20 mA analog DCS systems), and tree or "spur" connections in which each device is connected to a common point in a two-wire bus which may be, for example, a junction box or a termination area in one of the field devices within a process control network.

Data may be sent over the different bus segments 34a, 34b, and 34c at the same or different communication baud rates or speeds according to the Fieldbus protocol. For example, the Fieldbus protocol provides a 31.25 Kbit/s communication rate (H1), illustrated as being used by the bus segments 34b and 34c of FIG. 1, and a 1.0 Mbit/s and/or a 2.5 Mbit/s (H2) communication rate, which will be typically used for advanced process control, remote input/output, and high speed factory automation applications and is illustrated as being used by the bus segment 34a of FIG. 1. Likewise, data may be sent over the bus segments 34a, 34b, and 34c according to the Fieldbus protocol using voltage mode signaling or current mode signaling. Of course, the maximum length of each segment of the bus 34 is not strictly limited but is, instead, determined by the communication rate, cable type, wire size, bus power option, etc. of that section.

The Fieldbus protocol classifies the devices that can be connected to the bus 34 into three primary categories, namely, basic devices, link master devices, and bridge devices. Basic devices (such as devices 18, 20, 24, and 28 of FIG. 1) can communicate, that is, send and receive communication signals on or from the bus 34, but are not capable of controlling the order or timing of communication that occurs on the bus 34. Link master devices (such as devices 16, 22, and 26 as well as the host 12 of FIG. 1) are devices that communicate over the bus 34 and are capable of controlling the flow of and the timing of communication signals on the bus 34. Bridge devices (such as devices 30 and 32 of FIG. 1) are devices configured to communicate on and to interconnect individual segments or branches of a Fieldbus bus to create larger process control networks. If desired, bridge devices may convert between different data speeds and/or different data signaling formats used on the different segments of the bus 34, may amplify signals traveling between the segments of the bus 34, may filter the signals flowing between the different segments of the bus 34 and pass only those signals destined to be received by a device on one of the bus segments to which the bridge is coupled and/or may take other actions necessary to link different segments of the bus 34. Bridge devices that connect bus segments that operate at different speeds must have link master capabilities at the lower speed segment side of the bridge. The hosts 12 and 15, the PLC 13, and the controllers 14a and 14b may be any type of fieldbus device but, typically, will be link master devices.

Each of the devices 12–32 is capable of communicating over the bus 34 and, importantly, is capable of independently performing one or more process control functions using data acquired by the device, from the process, or from a different device via communication signals on the bus 34. Fieldbus devices are, therefore, capable of directly implementing portions of an overall control strategy which, in the past, were performed by a centralized digital controller of a DCS. To perform control functions, each Fieldbus device includes one or more standardized "blocks" which are implemented in a microprocessor within the device. In particular, each Fieldbus device includes one resource block, zero or more function blocks, and zero or more transducer blocks. These blocks are referred to as block objects.

A resource block stores and communicates device specific data pertaining to some of the characteristics of a Fieldbus device including, for example, a device type, a device revision indication, and indications of where other device specific information may be obtained within a memory of the device. While different device manufacturers may store different types of data in the resource block of a field device, each field device conforming to the Fieldbus protocol includes a resource block that stores some data.

A function block defines and implements an input function, an output function, or a control function associated with the field device and, thus, function blocks are generally referred to as input, output, and control function blocks. However, other categories of function blocks such as hybrid function blocks may exist or may be developed in the future. Each input or output function block produces at least one process control input (such as a process variable from a process measurement device) or process control output (such as a valve position sent to an actuation device) while each control function block uses an algorithm (which may be proprietary in nature) to produce one or more process outputs from one or more process inputs and control inputs. Examples of standard function blocks include analog input (AI), analog output (AO), bias (B), control selector (CS), discrete input (DI), discrete output (DO), manual loader (ML), proportional/derivative (PD), proportional/integral/derivative (PID), ratio (RA), and signal selector (SS) function blocks. However, other types of function blocks exist and new types of function blocks may be defined or created to operate in the Fieldbus environment.

A transducer block couples the inputs and outputs of a function block to local hardware devices, such as sensors and device actuators, to enable function blocks to read the outputs of local sensors and to command local devices to perform one or more functions such as moving a valve member. Transducer blocks typically contain information that is necessary to interpret signals delivered by a local device and to properly control local hardware devices including, for example, information identifying the type of a local device, calibration information associated with a local device, etc. A single transducer block is typically associated with each input or output function block.

Most function blocks are capable of generating alarm or event indications based on predetermined criteria and are capable of operating differently in different modes. Generally speaking, function blocks may operate in an automatic mode, in which, for example, the algorithm of a function block operates automatically; an operator mode in which the input or output of a function block, is controlled manually; an out-of-service mode in which the block does not operate; a cascade mode in which the operation of the block is affected from (determined by) the output of a different block; and one or more remote modes in which a remote computer determines the mode of the block. However, other modes of operation exist in the Fieldbus protocol.

Importantly, each block is capable of communicating with other blocks in the same or different field devices over the Fieldbus bus 34 using standard message formats defined by the Fieldbus protocol. As a result, combinations of function blocks (in the same or different devices) may communicate with each other to produce one or more decentralized control loops. Thus, for example, a PID function block in one field device may be connected via the bus 34 to receive an output of an AI function block in a second field device, to deliver data to an AO function block in third field device, and to receive an output of the AO function block as feedback to create a process control loop separate and apart from any DCS controller. In this manner, combinations of function blocks move control functions out of a centralized DCS environment, which allows DCS multi-function controllers to perform supervisory or coordinating functions or to be eliminated altogether. Furthermore, function blocks provide a graphical, block-oriented structure for easy configuration of a process and enable the distribution of functions among field devices from different suppliers because these blocks use a consistent communication protocol.

In addition to containing and implementing block objects, each field device includes one or more other objects including link objects, trend objects, alert objects, and view objects. Link objects define the links between the inputs and outputs of blocks (such as function blocks) both internal to the field device and across the Fieldbus bus 34.

Trend objects allow local trending of function block parameters for access by other devices such as the host 12 or controllers 14a and 14b of FIG. 1. Trend objects retain short-term historical data pertaining to some, for example, function block parameter and report this data to other devices or function blocks via the bus 34 in an asynchronous manner. Alert objects report alarms and events over the bus 34. These alarms or events may relate to any event that occurs within a device or one of the blocks of a device. View objects are predefined groupings of block parameters used in standard human/machine interfacing and may be sent to other devices for viewing from time to time.

Figure 2:
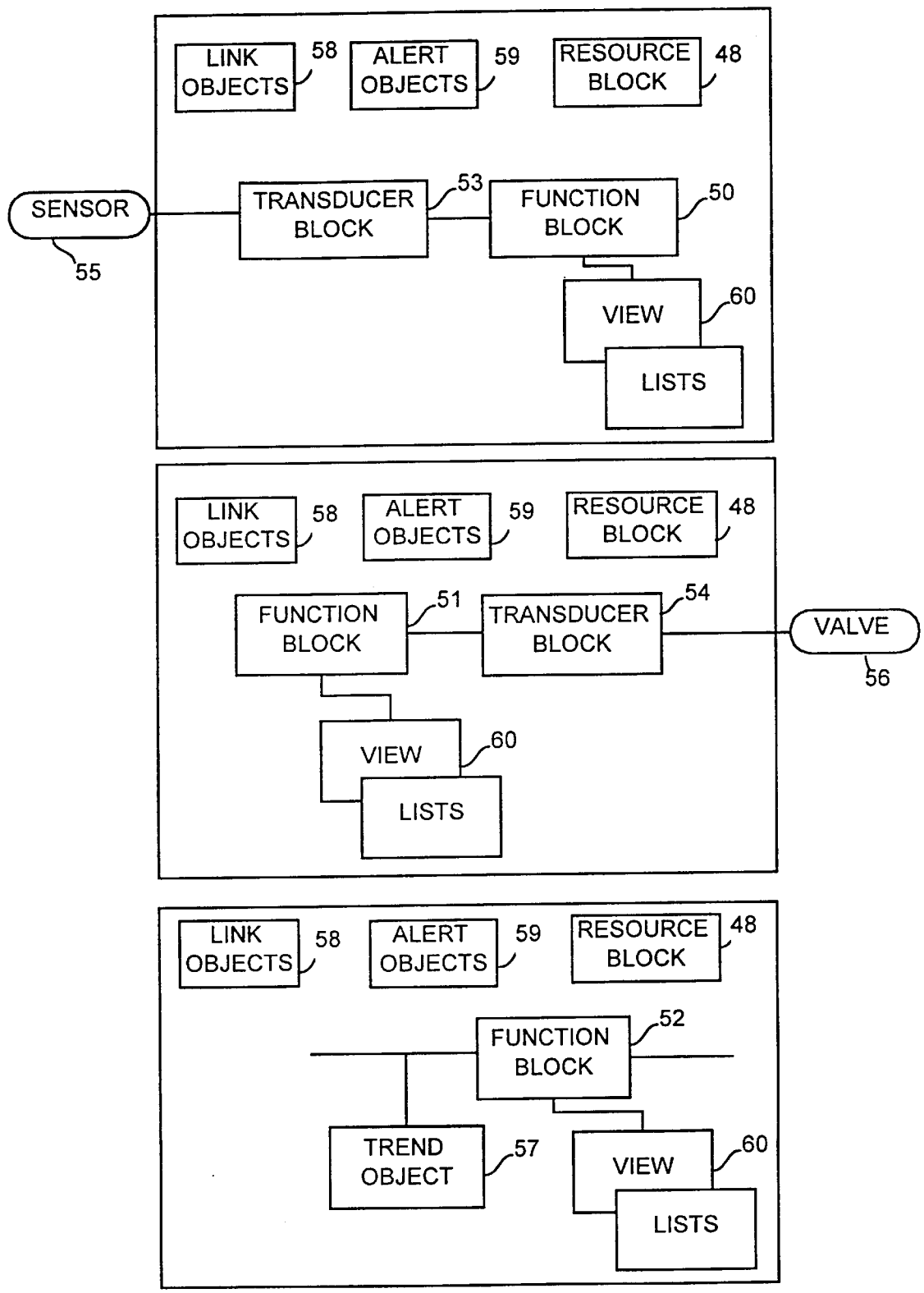
FIG. 2 is a schematic block diagram of Fieldbus devices having a set of three function blocks therein.

Referring now to FIG. 2, three Fieldbus devices, which may be, for example, any of the field devices 16–28 of FIG. 1, are illustrated as including resource blocks 48, function blocks 50, 51, or 52 and transducer blocks 53 and 54. In the first device, the function block 50 (which may be an input function block) is coupled through the transducer block 53 to a sensor 55, which may be, for example, a temperature sensor, a set point indication sensor, etc. In the second device, the function block 51 (which may be an output function block) is coupled through the transducer block 54 to an output device such as a valve 56. In the third device, function block 52 (which may be a control function block) has a trend object 57 associated therewith for trending the input parameter of the function block 52.

Link objects 58 define the block parameters of each of the associated blocks and alert objects 59 provide alarms or event notifications for the each of the associated blocks. View objects 60 are associated with each of the function blocks 50, 51, and 52 and include or group data lists for the function blocks with which they are associated. These lists contain information necessary for each of a set of different defined views. Of course, the devices of FIG. 2 are merely exemplary and other numbers of and types of block objects, link objects, alert objects, trend objects, and view objects may be provided in any field device.

Figure 3:
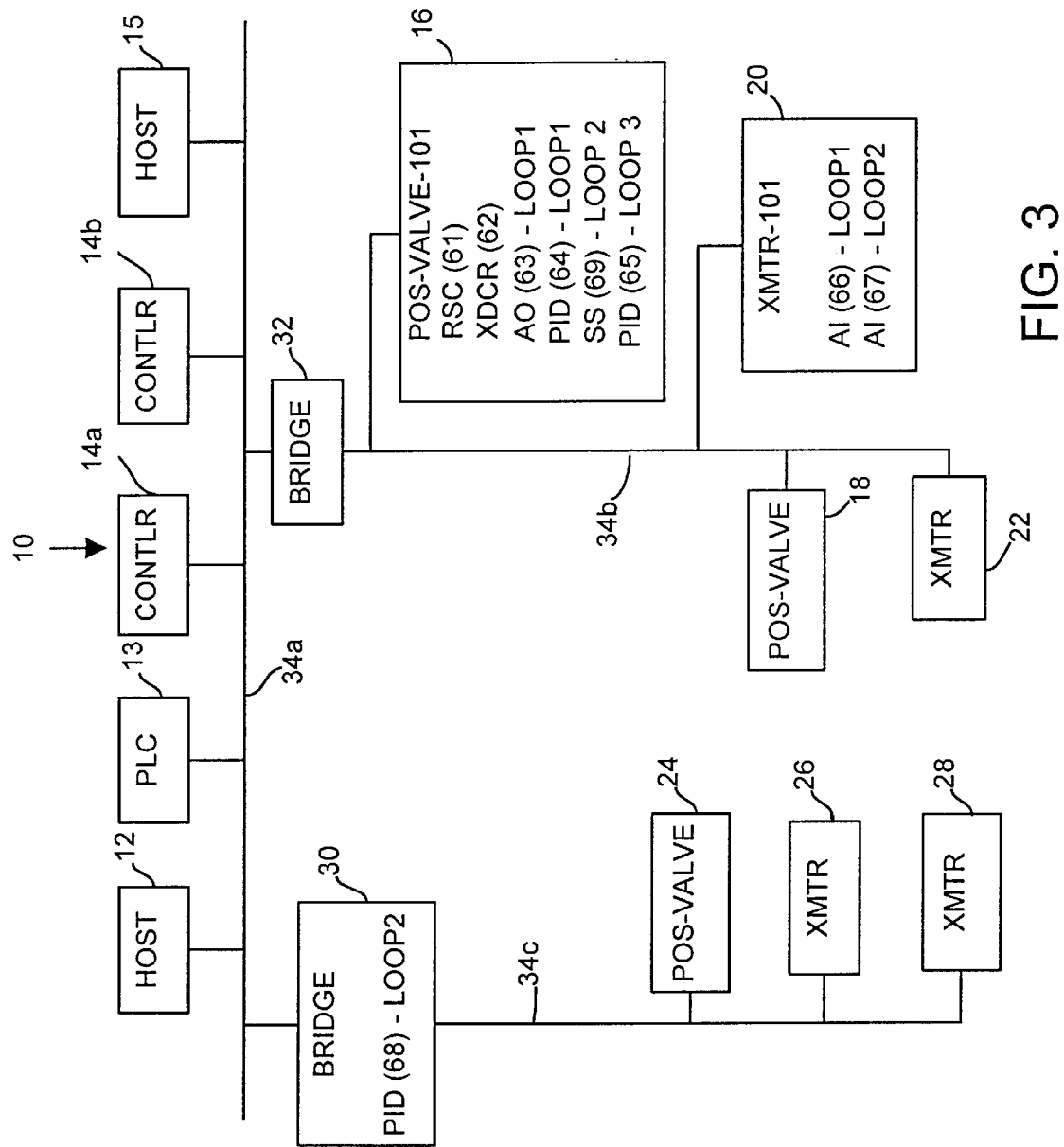
FIG. 3 is a schematic block diagram illustrating the function blocks within some of the devices of the process control network of FIG. 1.

Referring now to FIG. 3, a block diagram of the process control network 10 depicting the devices 16, 18, and 24 as positioner/valve devices and the devices 20, 22, 26, and 28 as transmitters also illustrates the function blocks associated with the positioner/valve 16, the transmitter 20, and the bridge 30. As illustrated in FIG. 3, the positioner/valve 16 includes a resource (RSC) block 61, a transducer (XDCR) block 62, and a number of function blocks including an analog output (AO) function block 63, two PID function blocks 64 and 65, and a signal select (SS) function block 69. The transmitter 20 includes a resource block 61, two transducer blocks 62, and two analog input (AI) function blocks 66 and 67. Also, the bridge 30 includes a resource block 61 and a PID function block 68.

As will be understood, the different function blocks of FIG. 3 may operate together (by communicating over the bus 34) in a number of control loops and the control loops in which the function blocks of the positioner/valve 16, the transmitter 20, and the bridge 30 are located are identified in FIG. 3 by a loop identification block connected to each of these function blocks. Thus, as illustrated in FIG. 3, the AO function block 63 and the PID function block 64 of the positioner/valve 16 and the AI function block 66 of the transmitter 20 are connected within a control loop indicated as LOOP1, while the SS function block 69 of the positioner/valve 16, the AI function block 67 of the transmitter 20, and the PID function block 68 of the bridge 30 are connected in a control loop indicated as LOOP2. The other PID function block 65 of the positioner/valve 16 is connected within a control loop indicated as LOOP3.

Figure 4:
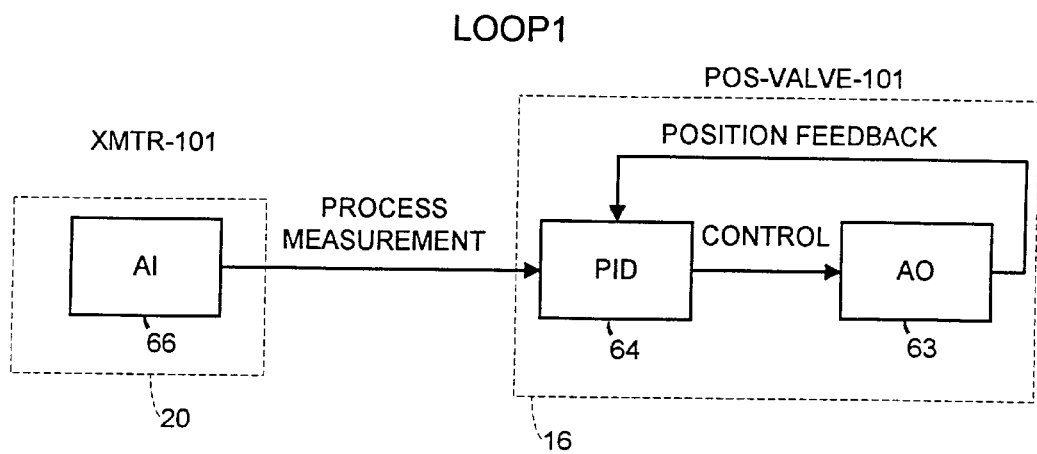
FIG. 4 is a control loop schematic for a process control loop within the process control network of FIG. 1.

The interconnected function blocks making up the control loop indicated as LOOP1 in FIG. 3 are illustrated in more detail in the schematic of this control loop depicted in FIG. 4. As can be seen from FIG. 4, the control loop LOOP1 is completely formed by communication links between the AO function block 63 and the PID function block 64 of the positioner/valve 16 and the AI function block 66 of the transmitter 20 (FIG. 3). The control loop diagram of FIG. 4 illustrates the communication interconnections between these function blocks using lines attaching the process and control inputs and outputs of these functions blocks. Thus, the output of the AI function block 66, which may comprise a process measurement or process parameter signal, is communicatively coupled via the bus segment 34b to the input of the PID function block 64 which has an output comprising a control signal communicatively coupled to an input of the AO function block 63. An output of the AO function block 63, which comprises a feedback signal indicating, for example, the position of the valve 16, is connected to a control input of the PID function block 64. The PID function block 64 uses this feedback signal along with the process measurement signal from the AI function block 66 to implement proper control of the AO function block 63. Of course the connections indicated by the lines in the control loop diagram of FIG. 4 may be performed internally within a field device when, as with the case of the AO and the PID function blocks 63 and 64, the function blocks are within the same field device (e.g., the positioner/valve 16), or these connections may be implemented over the two-wire communication bus 34 using standard Fieldbus synchronous communications. Of course, other control loops are implemented by other function blocks that are communicatively interconnected in other configurations.

To implement and perform communication and control activities, the Fieldbus protocol uses three general categories of technology identified as a physical layer, a communication "stack," and a user layer. The user layer includes the control and configuration functions provided in the form of blocks (such as function blocks) and objects within any particular process control device or field device. The user layer is typically designed in a proprietary manner by the device manufacturer but must be capable of receiving and sending messages according to the standard message format defined by the Fieldbus protocol and of being configured by a user in standard manners. The physical layer and the communication stack are necessary to effect communication between different blocks of different field devices in a standardized manner using the two-wire bus 34 and may be modeled by the well-known Open Systems Interconnect (OSI) layered communication model.

The physical layer, which corresponds to OSI layer 1, is embedded in each field device and the bus 34 and operates to convert electromagnetic signals received from the Fieldbus transmission medium (the two-wire bus 34) into messages capable of being used by the communication stack of the field device. The physical layer may be thought of as the bus 34 and the electromagnetic signals present on the bus 34 at the inputs and outputs of the field devices.

The communication stack, which is present in each Fieldbus device, includes a data link layer, which corresponds to OSI layer 2, a Fieldbus access sublayer, and a Fieldbus message specification layer, which corresponds to OSI layer 6. There is no corresponding structure for OSI layers 3–5 in the Fieldbus protocol. However, the applications of a fieldbus device comprise a layer 7 while a user layer is a layer 8, not defined in the OSI protocol. Each layer in the communication stack is responsible for encoding or decoding a portion of the message or signal that is transmitted on the Fieldbus bus 34. As a result, each layer of the communication stack adds or removes certain portions of the Fieldbus signal such as preambles, start delimiters, and end delimiters and, in some cases, decodes the stripped portions of the Fieldbus signal to identify where the rest of the signal or message should be sent or if the signal should be discarded because, for example, it contains a message or data for function blocks that are not within the receiving field device.

The data link layer controls transmission of messages onto the bus 34 and manages access to the bus 34 according to a deterministic centralized bus scheduler called a link active scheduler, to be described in more detail below. The data link layer removes a preamble from the signals on the transmission medium and may use the received preamble to synchronize the internal clock of the field device with the incoming Fieldbus signal. Likewise, the data link layer converts messages on the communication stack into physical Fieldbus signals and encodes these signals with clock information to produce a "synchronous serial" signal having a proper preamble for transmission on the two-wire bus 34. During the decoding process, the data link layer recognizes special codes within the preamble, such as start delimiters and end delimiters, to identify the beginning and the end of a particular Fieldbus message and may perform a checksum to verify the integrity of the signal or message received from the bus 34. Likewise, the data link layer transmits Fieldbus signals on the bus 34 by adding start and end delimiters to messages on the communication stack and placing these signals on the transmission medium at the appropriate time.

The Fieldbus message specification layer allows the user layer (i.e., the function blocks, objects, etc. of a field device) to communicate across the bus 34 using a standard set of message formats and describes the communication services, message formats, and protocol behaviors required to build messages to be placed onto the communication stack and to be provided to the user layer. Because the Fieldbus message specification layer supplies standardized communications for the user layer, specific Fieldbus message specification communication services are defined for each type of object described above. For example, the Fieldbus message specification layer includes object dictionary services which allows a user to read an object dictionary of a device. The object dictionary stores object descriptions that describe or identify each of the objects (such as block objects) of a device. The Fieldbus message specification layer also provides context management services which allows a user to read and change communication relationships, known as virtual communication relationships (VCRs) described hereinafter, associated with one or more objects of a device. Still further, the Fieldbus message specification layer provides variable access services, event services, upload and download services, and program invocation services, all of which are well known in the Fieldbus protocol and, therefore, will not be described in more detail herein. The Fieldbus access sublayer maps the Fieldbus message specification layer into the data link layer.

To allow or enable operation of these layers, each Fieldbus device includes a management information base (MIB), which is a database that stores VCRs, dynamic variables, statistics, link active scheduler timing schedules, function block execution timing schedules and device tag and address information. Of course, the information within the MIB may be accessed or changed at any time using standard Fieldbus messages or commands. Furthermore, a device description is usually provided with each device to give a user or a host an extended view of the information in the VFD. A device description, which must typically be tokenized to be used by a host, stores information needed for the host to understand the meaning of the data in the VFDs of a device.

As will be understood, to implement any control strategy using function blocks distributed throughout a process control network, the execution of the function blocks must be precisely scheduled with respect to the execution of other function blocks in a particular control loop. Likewise, communication between different function blocks must be precisely scheduled on the bus 34 so that the proper data is provided to each function block before that block executes.

The way in which different field devices (and different blocks within field devices) communicate over the Fieldbus transmission medium will now be described with respect to FIG. 1. For communication to occur, one of the link master devices on each segment of the bus 34 (for example, devices 12, 16, and 26) operates as a link active scheduler (LAS) which actively schedules and controls communication on the associated segment of the bus 34. The LAS for each segment of the bus 34 stores and updates a communication schedule (a link active schedule) containing the times that each function block of each device is scheduled to start periodic communication activity on the bus 34 and the length of time for which this communication activity is to occur. While there may be one and only one active LAS device on each segment of the bus 34, other link master devices (such as the device 22 on the segment 34b) may serve as backup LASs and become active when, for example, the current LAS fails. Basic devices do not have the capability to become an LAS at any time.

Generally speaking, communication activities over the bus 34 are divided into repeating macrocycles, each of which includes one synchronous communication for each function block active on any particular segment of the bus 34 and one or more asynchronous communications for one or more of the functions blocks or devices active on a segment of the bus 34. A device may be active, i.e., send data to and receive data from any segment of the bus 34, even if it is physically connected to a different segment of the bus 34, through coordinated operation of the bridges and the LASs on the bus 34.

During each macrocycle, each of the function blocks active on a particular segment of the bus 34 executes, usually at a different, but precisely scheduled (synchronous) time and, at another precisely scheduled time, publishes its output data on that segment of the bus 34 in response to a compel data command generated by the appropriate LAS. Preferably, each function block is scheduled to publish its output data shortly after the end of the execution period of the function block. Furthermore, the data publishing times of the different function blocks are scheduled serially so that no two function blocks on a particular segment of the bus 34 publish data at the same time. During the time that synchronous communication is not occurring, each field device is allowed, in turn, to transmit alarm data, view data, etc. in an asynchronous manner using token driven communications. The execution times and the amount of time necessary to complete execution of each function block are stored in the management information base (MIB) of the device in which the function block resides while, as noted above, the times for sending the compel data commands to each of the devices on a segment of the bus 34 are stored in the MIB of the LAS device for that segment. These times are typically stored as offset times because they identify the times at which a function block is to execute or send data as an offset from the beginning of an "absolute link schedule start time," which is known by all of the devices connected to the bus 34.

To effect communications during each macrocycle, the LAS, for example, the LAS 16 of the bus segment 34b, sends a compel data command to each of the devices on the bus segment 34b according to the list of transmit times stored in the link active schedule. Upon receiving a compel data command, a function block of a device publishes its output data on the bus 34 for a specific amount of time. Because each of the functions blocks is typically scheduled to execute so that execution of that block is completed shortly before the block is scheduled to receive a compel data command, the data published in response to a compel data command should be the most recent output data of the function block. However, if a function block is executing slowly and has not latched new outputs when it receives the compel data command, the function block publishes the output data generated during the last run of the function block and indicates that the published data is old data using a time-stamp.

After the LAS has sent a compel data command to each of the function blocks on particular segment of the bus 34 and during the times that function blocks are executing, the LAS may cause asynchronous communication activities to occur. To effect asynchronous communication, the LAS sends a pass token message to a particular field device. When a field device receives a pass token message, that field device has full access to the bus 34 (or a segment thereof) and can send asynchronous messages, such as alarm messages, trend data, operator set point changes, etc. until the messages are complete or until a maximum allotted "token hold time" has expired. Thereafter the field device releases the bus 34 (or any particular segment thereof) and the LAS sends a pass token message to another device. This process repeats until the end of the macrocycle or until the LAS is scheduled to send a compel data command to effect synchronous communication. Of course, depending on the amount of message traffic and the number of devices and blocks coupled to any particular segment of the bus 34, not every device may receive a pass token message during each macrocycle.

Figure 5:
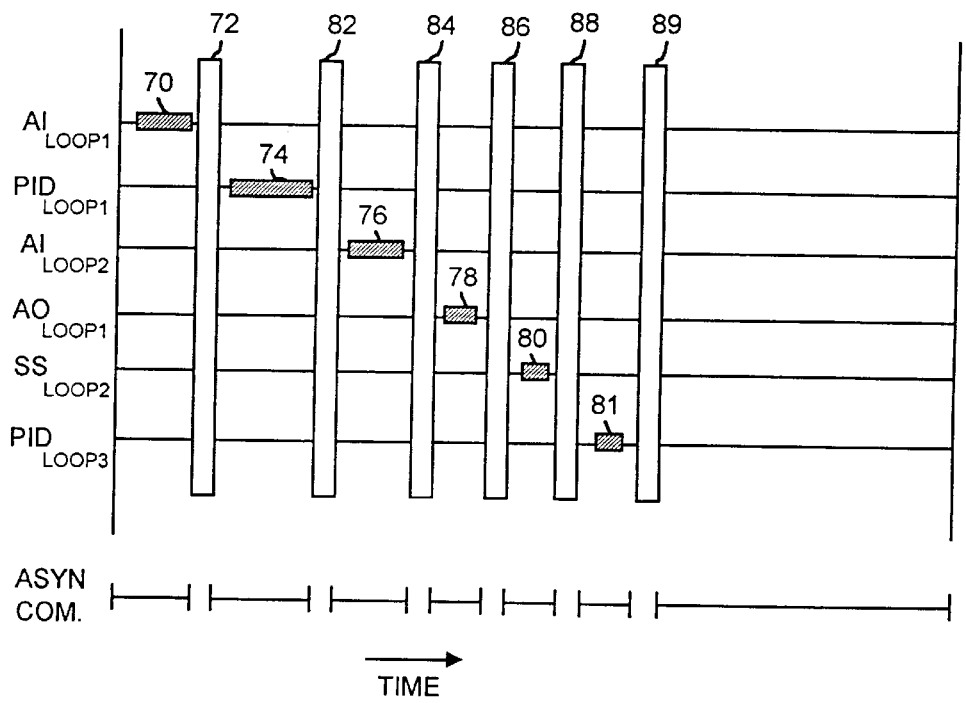
FIG. 5 is a timing schematic for a macrocycle of a segment of the bus of the process control network of FIG. 1.

FIG. 5 illustrates a timing schematic depicting the times at which function blocks on the bus segment 34b of FIG. 1 execute during each macrocycle of the bus segment 34b and the times at which synchronous communications occur during each macrocycle associated with the bus segment 34b. In the timing schedule of FIG. 5, time is indicated on the horizontal axis and activities associated with the different function blocks of the positioner/valve 16 and the transmitter 20 (of FIG. 3) are illustrated on the vertical axis. The control loop in which each of the functions blocks operates is identified in FIG. 5 as a subscript designation. Thus $AI_{LOOP1}$ refers to the AI function block 66 of the transmitter 20, $PID_{LOOP1}$ refers to the PID function block 64 of the positioner/valve 16, etc. The block execution period of each of the illustrated function blocks is depicted by a cross-hatched box while each scheduled synchronous communication is identified by a vertical bar in FIG. 5.

Thus, according to the timing schedule of FIG. 5, during any particular macrocycle of the segment 34b (FIG. 1), the $AI_{LOOP1}$ function block executes first for the time period specified by the box 70. Then, during the time period indicated by the vertical bar 72, the output of the $AI_{LOOP1}$ function block is published on the bus segment 34b in response to a compel data command from the LAS for the bus segment 34b. Likewise, the boxes 74, 76, 78, 80, and 81 indicate the execution times of the function blocks $PID_{LOOP1}$, $AI_{LOOP2}$, $AO_{LOOP1}$, $SS_{LOOP2}$, and $PID_{LOOP3}$, respectively (which are different for each of the different blocks), while the vertical bars 82, 84, 86, 88, and 89 indicate the times that the function blocks $PID_{LOOP1}$, $AI_{LOOP2}$, $AO_{LOOP1}$, $SS_{LOOP2}$, and $PID_{LOOP3}$, respectively, publish data on the bus segment 34b.

As will be apparent, the timing schematic of FIG. 5 also illustrates the times available for asynchronous communication activities, which may occur during the execution times of any of the function blocks and during the time at the end of the macrocycle during which no function blocks are executing and when no synchronous communication is taking place on the bus segment 34b. Of course, if desired, different function blocks can be intentionally scheduled to execute at the same time and not all function blocks must publish data on the bus if, for example, no other device subscribes to the data produced by a function block.

Field devices are able to publish or transmit data and messages over the bus 34 using one of three virtual communication relationships (VCRs) defined in the Fieldbus access sublayer of the stack of each field device. A client/server VCR is used for queued, unscheduled, user initiated, one to one, communications between devices on the bus 34. Such queued messages are sent and received in the order submitted for transmission, according to their priority, without overwriting previous messages. Thus, a field device may use a client/server VCR when it receives a pass token message from an LAS to send a request message to another device on the bus 34. The requester is called the "client" and the device that receives the request is called the "server." The server sends a response when it receives a pass token message from the LAS. The client/server VCR is used, for example, to effect operator initiated requests such as set point changes, tuning parameter access and changes, alarm acknowledgements, and device uploads and downloads.

A report distribution VCR is used for queued, unscheduled, user initiated, one to many communications.

For example, when a field device with an event or a trend report receives a pass token from an LAS, that field device sends its message to a "group address" defined in the Fieldbus access sublayer of the communication stack of that device. Devices that are configured to listen on that VCR will receive the report. The report distribution VCR type is typically used by Fieldbus devices to send alarm notifications to operator consoles.

A publisher/subscriber VCR type is used for buffered, one to many communications. Buffered communications are ones that store and send only the latest version of the data and, thus, new data completely overwrites previous data. Function block outputs, for example, comprise buffered data. A "publisher" field device publishes or broadcasts a message using the publisher/subscriber VCR type to all of the "subscriber" field devices on the bus 34 when the publisher device receives a compel data message from the LAS or from a subscriber device. The publisher/subscriber relationships are predetermined and are defined and stored within the Fieldbus access sublayer of the communication stack of each field device.

To assure proper communication activities over the bus 34, each LAS periodically sends a time distribution message to all of the field devices connected to a segment of the bus 34, which enables the receiving devices to adjust their local application time to be in synchronization with one another. Between these synchronization messages, clock time is independently maintained in each device based on its own internal clock. Clock synchronization allows the field devices to time stamp data throughout the Fieldbus network to indicate, for example, when data was generated.

Furthermore, each LAS (and other link master device) on each bus segment stores a "live list," which is a list of all the devices that are connected to that segment of the bus 34, i.e., all of the devices that are properly responding to a pass token message. The LAS continually recognizes new devices added to a bus segment by periodically sending probe node messages to addresses that are not on the live list. In fact, each LAS is required to probe at least one address after it has completed a cycle of sending pass token messages to all of the field devices in the live list. If a field device is present at the probed address and receives the probe node message, the device immediately returns a probe response message. Upon receiving a probe response message, the LAS adds the device to the live list and confirms by sending a node activation message to the probed field device. A field device remains on the live list as long as that field device responds properly to pass token messages. However, an LAS removes a field device from the live list if the field device does not, after three successive tries, either use the token or immediately return the token to the LAS. When a field device is added to or removed from the live list, the LAS broadcasts changes in the live list to all the other link master devices on the appropriate segment of the bus 34 to allow each link master device to maintain a current copy of the live list.

As noted above, the communication interconnections between the field devices and the function blocks thereof are determined by a user and are implemented within the process control network 10 using a configuration application located in, for example, the host 12. However, after being configured, the process control network 10 operates without any consideration for device or process diagnostics and, therefore, interfaces with the host 12 to perform standard I/O functions, but not diagnostic functions.

When a user wishes to perform diagnostics, the user may have the host 12 send set point changes to, for example, the AO function block 63 of the control LOOP1 and record feedback in the AO function block 63 using a trend object associated with the AO function block 63. However, to perform this type of communication, the host 12 must use asynchronous (non-published) communications which allow the host 12 access to the bus 34 only when the host 12 receives a pass token message from an LAS. As a result, the different parts of the diagnostic signal generated by the host 12 may not reach the AO function block 63 at precisely determined times (or precisely scheduled times) which means that the diagnostic signal received at the AO function block 63 will have a shape that is, at least in part, determined by the communications backlog on the bus 34 at any particular time. For this reason, any diagnostic signal sent using asynchronous communications will not be strictly deterministic and, thus, may not be very effective in performing diagnostics on a device or a process. Furthermore, the host 12 has no way of guaranteeing that the feedback data collected by the trend object(s) will not be lost due to overwrites, etc. Also, the host 12 has no way of controlling the mode of the other function blocks in LOOP1, such as the PID function block 64, without specifically changing the mode of that block.

Until now, in order to assure complete and strictly deterministic diagnostics in a process, a user had to take the process control network 10 off-line and reconfigure the communication interfaces therein so that the host 12 was able to send set point changes to the appropriate devices and receive data measured by appropriate devices via synchronous communications. However, as noted above, this procedure shuts the process down and requires an operator to reconfigure the process control network whenever diagnostics are to be performed, both of which are undesirable. Furthermore, the control implemented by the host 12 during this diagnostic procedure is different than the control being implemented by the communicatively linked function blocks during normal operation of the process and, therefore, collected process data may not be indicative of the operation of the process while the process is being controlled normally. As a result, host devices typically do not include the capability of allowing a user to switch between normal and diagnostic operations to thereby enable diagnostics.

To overcome these problems in, for example, a Fieldbus process control network, a new type of function block is provided according to the present invention to perform device and/or process diagnostics on or using a device other than the one in which the new diagnostic function block is located. The remote diagnostic function block of the present invention is configured to communicate with function blocks of other devices over the bus 34 using synchronous periodic communications (e.g., the publisher/subscriber VCR of Fieldbus protocol) and to receive data, such as measurements of device parameters or other process parameters, using synchronous periodic communications. In this manner, the diagnostic function block of the present invention is capable of sending a deterministic diagnostic control signal to a different function block and of receiving and storing data pertaining to a device or a process parameter in a periodic manner. Furthermore, the remote diagnostic function block of the present invention may be stored in a device other than the device on which a diagnostic is being performed, which allows the diagnostic function block to be used to perform diagnostics on or using any number of different devices within a process control network. Thus, for example, a remote diagnostic function block according to the present invention may be stored in the positioner of the positioner/valve device 18 of FIG. 3 and be used to perform diagnostics on any of the positioner/valves 16, 18, and 24. Likewise, a diagnostic function block according to the present invention can be stored in the host 12 to enable that function block to be used on any device within any segment of the bus 34.

Generally speaking, the remote diagnostic function block of the present invention may be communicatively linked to a function block of another device (or the same device) during the times that a device diagnostic is being performed and then decoupled from the other function block during the times that no device diagnostic is being performed. Alternatively, the remote diagnostic function block of the present invention may be placed in a control loop so that it remains communicatively linked to other function blocks within the control loop even when diagnostics, such as device or process diagnostics, are not being performed.

Figure 6:
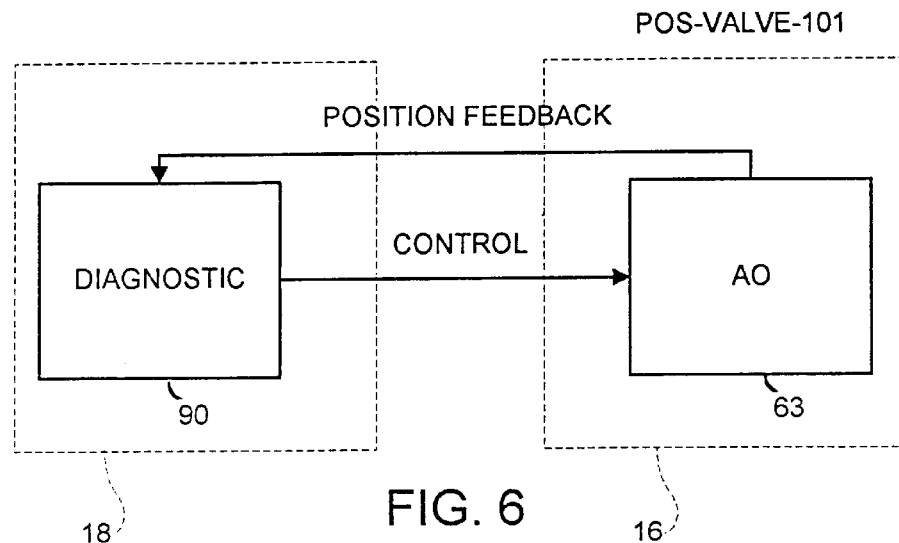
FIG. 6 is a control loop schematic including a remote device diagnostic function block according to the present invention.

Referring now to FIG. 6, a diagnostic function block 90 is illustrated as being communicatively linked or coupled to the AO function block 63 of the positioner/valve 16 (FIG. 3) such that an output of the diagnostic function block 90 is connected to an input of the AO function block 63 and an output of the AO function block 63 is connected to a feedback input of the diagnostic function block 90. During operation, the diagnostic function block 90 sends a diagnostic control signal specifying changes in the set point of the AO function block 63 over the bus segment 34b (FIG. 3) via regularly scheduled periodic communications (e.g., using a publisher/subscriber VCR) and also receives a feedback signal from the AO function block 63 indicating, for example, the position of a valve member of the valve 16, over the bus segment 34b via regularly scheduled periodic communications. The diagnostic function block 90 stores the received feedback signal produced by the AO function block 63 and, after the entire diagnostic signal is sent to the AO function block 63 or at one or more intermediate times during the diagnostic, sends the received feedback signal and, if desired, an indication of the diagnostic control signal used to control the AO function block 63, to the host 12 for processing. Of course, if desired, the diagnostic function block 90 can also have a processor or other device that performs device diagnostics using the diagnostic control signal and the feedback signals received from the AO function block 63.

As noted above, the inter-device communication connections illustrated by the diagnostic control loop of FIG. 6 are implemented using synchronous periodic communications and, therefore, the diagnostic control signal generated by the function block 90 is guaranteed to be the same signal received at the input of the AO function block 63. Likewise, these synchronous communications assure that the output data developed by the AO function block 63 is tracked and recorded in a periodic manner.

Of course, to implement the diagnostic control loop of FIG. 6, a host, such as the host 12, must reconfigure the process control network 10 to connect the diagnostic function block 90 to the AO function block 63 in the manner indicated in FIG. 6 and must then instruct the diagnostic function block 90 to run a diagnostic test on the AO function block 63. After the diagnostic test is complete and the function block 90 has sent all of the stored data to the host 12 (or other device) for processing, the host 12 must reconfigure the process control network 10 to reinstall the control scheme used during normal operation of the process control network 10. Preferably, the host 12 (or other configurer) stores the normal or existing control scheme while the diagnostic loop illustrated in FIG. 6 is being implemented or run.

While the diagnostic function block 90 of FIG. 6 is illustrated as being located in the device 18 to perform a device diagnostic on the positioner/valve device 16, this function block could be located in any other device in the process control network 10 and could be used to perform a diagnostic on any device in the process control network 10, including any output device like a positioner, a positioner/valve device, a damper, a fan, etc.

Figure 7:
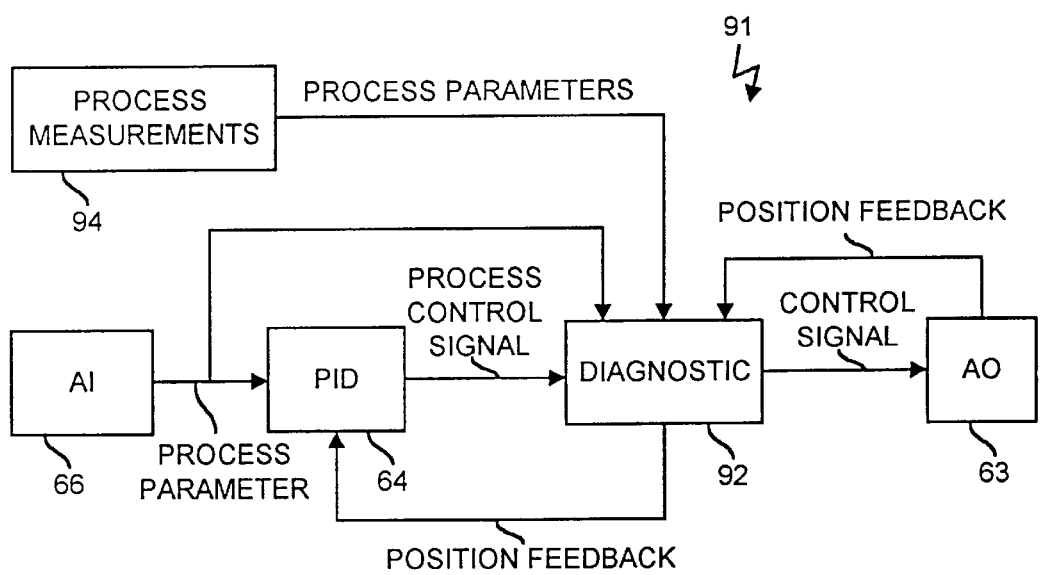
FIG. 7 is a control loop schematic including a remote device or process diagnostic function block according to the present invention.

However, as noted above, a diagnostic function block according to the present invention can be connected within a process control loop configuration at all times during the operation of that process control loop to enable device and process diagnostics to be implemented or performed without reconfiguring the process control network. Referring now to FIG. 7, a control loop 91 including the AI function block 66, the PID function block 64, the AO function block 63, and a diagnostic function block 92 is illustrated. As can be seen from FIG. 7, the diagnostic function block 92 is inserted (communicatively linked) within the control loop 91 between the AO function block 63 and the PID function block 64.

During normal operation of the process control loop 91, the AI function block 66 delivers a process measurement or process parameter to the PID function block 64 which then sends a developed process control signal to the diagnostic function block 92. The diagnostic function block 92 passes this process control signal through to an input of the AO function block 63 within the positioner/valve device 16 and receives a feedback signal indicating, for example, valve position, from the AO function block 63. The diagnostic function block 92 then passes the feedback signal to a control input of the PID function block 64, which uses this feedback signal (along with the input from the AI function block 66) to calculate a new process control signal. Thus, during normal operation of the process control loop 91, the diagnostic function block 92 merely passes signals between the PID function block 64 and the AO function block 63 to allow these function blocks to operate in essentially the same manner as when connected in the control loop of FIG. 4.

However, when a user wishes to implement a device or a process diagnostic, the host 12 sends a start signal to the diagnostic function block 92 (via asynchronous communications) which causes the diagnostic function block 92 to disconnect the process control signal developed by the PID function block 64 from the input of the AO function block 63 and to deliver a diagnostic control signal to the input of the AO function block 63. Of course, the diagnostic control signal may be any desired signal used to implement device or process diagnostics. Simultaneously, the diagnostic function block 92 begins to store feedback data received from the AO function block 63 and/or to store other sampled process measurements received from, for example, the AI function block 66 and/or any other process measurement devices or function blocks within the process, indicated in FIG. 7 by a block 94. Of course, the process parameters from the block 94 and the AI function block 66 may be stored in the diagnostic function block 92 using trend objects or any other desired storage unit for eventual delivery to the host 12 for use in performing diagnostic analyses.

During operation of a device or process diagnostic, the diagnostic function block 92 may send feedback data to the PID function block 64 and may, if desired, alter this feedback signal to indicate to the PID function block 64 that a diagnostic is being run. In this manner, the diagnostic function block 92 controls the behavior (mode) of the PID function block 64 and/or the behavior (mode) of other function blocks in the control loop 91 while performing a device or a process diagnostic which, in the case of the PID function block 64, help prevent windup.

After the diagnostic function block 92 finishes sending the diagnostic control signal to the AO function block 63, the diagnostic function block 92 switches to again deliver the process control signal developed by the PID function block 64 to the AO function block 63 and to provide unaltered feedback signals from the AO function block 63 to the PID function block 64. Furthermore, at one or more intermediate times during the diagnostic or after the diagnostic is complete, the diagnostic function block 92 may send collected feedback, process parameter and/or diagnostic control signal information to the host 12 (or other device) over the bus 34 using, for example, asynchronous communications.

As will be understood, the diagnostic function block 92 is communicatively linked to the PID function block 64 and to the AO function block 63 via scheduled periodic communications and, therefore, causes the operation of the control loop 91 to take a little longer during each macrocycle associated with the control loop 91. That is, each macrocycle for the control loop 91 must have more time dedicated to synchronous communications and function block executions than the macrocycle for the control loop of FIG. 4 due to the additional periodic communication scheduling needed for the diagnostic function block 92. In fact, to properly insert the diagnostic function block 92 into the control loop of FIG. 4, an execution period for the function block 92 must be inserted into the timing schedule of FIG. 5 after the bar 82 (the scheduled communication associated with the PID function block 64) and a scheduled communication (publishing) period for communication between the diagnostic function block 92 and the AO function block 63 must be inserted into the timing schedule of FIG. 5 after the inserted execution period of the function block 92 and before the box 78 (the execution period of the AO function block 63). Likewise, scheduled execution and communication periods for effecting feedback communication between the diagnostic function block 92 and the PID function block 64 must be inserted into the timing schedule of FIG. 5 after the bar 86 (the scheduled communication period for the AO function block 63). Of course, the VCRs of the AO function block 63 and the PID function block 64 must be altered to properly effect scheduled communications between these function blocks and the diagnostic function block 92.

While the diagnostic function block 92 can remain in the control loop 91 during normal operation of the process control network 10 (i.e., when a diagnostic is not being performed), if desired, the diagnostic function block 92 can be inserted into the schedule of a control loop, such as the control loop 91, only at the times that the diagnostic is to be performed so that the control loops of a process control network 10 are configured to run as fast as possible when a diagnostic is not being performed. However, this operation requires that a new process control configuration be downloaded into the network whenever a process diagnostic is to be run.

Figure 8:
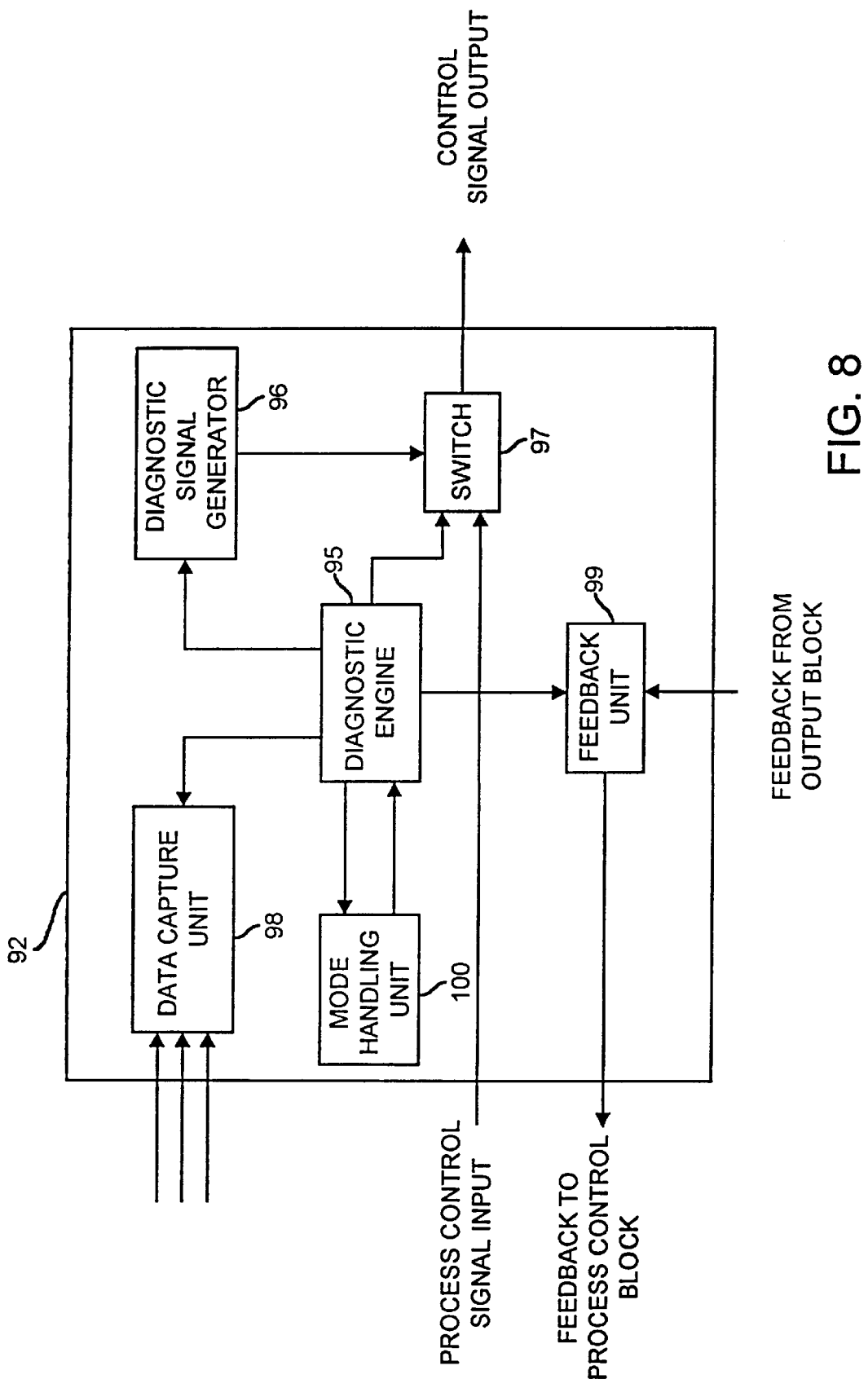
FIG. 8 is a schematic block diagram of the diagnostic function block of FIG. 7.

The diagnostic function block 92, illustrated in more detail in FIG. 8, includes a diagnostic engine 95 that receives and decodes start and stop signals from the host 12, sends collected data to the host 12 for analysis and generally controls the operation of the rest of the diagnostic function block 92. When the diagnostic engine 95 receives and decodes a start signal, the diagnostic engine 95 causes a diagnostic signal generator 96 to the deliver a stored diagnostic control signal to a switch 97. Simultaneously, the diagnostic engine 95 causes the switch 97, which comprises a signal communicator, to connect an output thereof to the diagnostic signal generator 96 so that the diagnostic control signal provided by the diagnostic signal generator 96 is provided to a control signal output of the function block 92 for delivery to, for example, an input of the AO function block 63. Before being directed to connect the control signal output to the diagnostic signal generator 96, the switch 97 couples a process control signal input (connected to receive a process control signal from, for example, the PID function block 64) to the control signal output. Of course, the switch 97 is typically implemented in software and, therefore, may comprise any switching logic designed to control whether the diagnostic control signal or the process control signal (at the process control signal input) is delivered to the control signal output of the diagnostic function block 92.

When operating to perform a device or process diagnostic, the diagnostic engine 95 enables a data capture unit 98 to collect and store the process measurement or process parameter signals collected by other function blocks within the process control network 10 and sent to the diagnostic function block 92 using scheduled periodic communications. As will be understood, any number of process parameters may be delivered to the data capture unit 98 depending upon the type of diagnostic being performed.

A feedback unit 99 receives feedback signals developed by the AO function block 63 (or any other function block being controlled by the diagnostic function block 92) and, if directed to do so by the diagnostic engine 95, stores these signals in memory. Likewise, the feedback unit 99 may send received feedback signals to the PID function block 64 (or any other function block such as the one generating the process control signal used to control the AO function block 63).

Typically, in a Fieldbus environment, the signals received by the feedback unit 99 include a value and a status, wherein the status indicates different states of the control loop 91 associated with the received feedback signals. If desired, the feedback unit 99 may change the status of the signals received from the AO function block 63 from, for example, a "good-cascade-nonspecific" status, indicating normal operation of the control loop 91, to a "good-cascade-override" status, indicating that a local override has taken place and that, therefore, the signal is not being generated according to the normal operation of the control loop 91. When the feedback signal with the altered status is delivered to, for example, the PID function block 64, the PID function block 64 decodes the status of that signal and recognizes that the output of the PID function block 64 is no longer being used to control the AO function block 63. The PID function block 64 may, thereafter, shed or change mode to, for example, a manual mode, in which the PID function block 64 locks its output and stops calculating new process control signals from the AO feedback signals and the output of the AI function block 66. This mode shedding process prevents the PID function block 64 from entering a runaway state in which the control signal produced by the PID function block 64 is quickly driven to an extreme because the PID function block 64 is trying to force the feedback signal to a controlled value with no effect. As will be understood, the change in mode of the PID function block 64 may cause other function blocks within the control loop 91 or within the process control network 10 to also change mode. Of course, when a diagnostic is completed and the control loop 91 is operating to allow the PID function block 64 to control the AO function block 63, the feedback unit 99 passes the feedback signal therethrough without changing the status of that signal.

To effect proper mode handling, a mode handling unit 100 stores logic and data pertaining to the proper status changes to be made to the feedback signal or other collected signals to effect desired mode changes in other function blocks and communicates this information to the diagnostic engine 95.

Of course, the diagnostic engine 95 may start and stop the diagnostics or may control one of a number of different diagnostic control signals to be produced at the control signal output of the diagnostic function block 92 based on any desired criteria and may, for example, use one or more of the feedback signals from the AO function block 63 and the process parameter signals collected by the data capture unit 98 as limiting factors when implementing a diagnostic test. Moreover, in a Fieldbus network, the diagnostic control signals are preferably stored as digital signals or are generated according to some function stored in the diagnostic signal generator 96. However, diagnostic control signals may be stored or generated in the diagnostic function block 92 in any other desired manner.

As will be understood, the diagnostic function blocks 90 and 92 described herein allow or enable device and/or process diagnostics to be implemented using synchronous, scheduled communications to assure that a deterministic signal is delivered to a device during a diagnostic procedure. Likewise, the diagnostic function block 92 described herein allows or enables device and process diagnostics to be implemented using the same process control configuration as implemented during normal operation of a process, which enables a user to perform a device or a process diagnostic without having to reschedule or reconfigure a process control network in any significant manner and which allow accurate process measurements to be made during the diagnostic.

Although the diagnostic function blocks 90 and/or 92 have been described herein as performing diagnostics on or using a downstream AO function block 63 (which is an output function block), and as receiving inputs from and delivering feedback to an upstream PID function block 64 (which is a control function block) connected in a simple control loop configuration, the diagnostic function block or other diagnostic function routine of the present invention can be used in conjunction with other output functions or function blocks and other control functions or function blocks as desired and can be implemented in control loops having configurations other than that illustrated in FIG. 7. Thus, for example, the diagnostic function block 92 could be configured to control one function block, receive a feedback signal from a different function block and receive a process control signal from a still further function block.

Moreover, while the diagnostics described herein have been implemented in the form of a Fieldbus "function block," it is noted that the diagnostics of the present invention can be implemented using other types of blocks, programs, hardware, firmware, etc., associated with other types of control systems and/or communication protocols. In fact, while the Fieldbus protocol uses the term "function block" to describe a particular type of entity capable of performing a process control function, it is noted that the term function block as used herein is not so limited and includes any sort of device, program, routine, or other entity capable of performing a process control function in any manner at distributed locations within a process control network. Thus, the diagnostic function blocks described and claimed herein can be implemented in other process control networks or using other process control communication protocols or schemes (that may now exist or that may be developed in the future) which do not use what the Fieldbus protocol strictly identifies as a "function block" as long as these networks or protocols provide for or allow control functions to be performed at distributed locations within a process.

Still further, while process and device diagnostic function blocks have been described herein as being used in performing diagnostics on (or using) positioner/valve devices, it is noted that these function blocks can be used to perform diagnostics on (or using) other types of devices, such as those having moveable elements like dampers, fans, etc.

Moreover, although the diagnostics described herein are preferably implemented in software stored in a process control device, they may alternatively or additionally be implemented in hardware, firmware, etc., as desired. If implemented in software, the diagnostics of the present invention may be stored in any computer readable memory such as on a magnetic disk, a laser disk, or other storage medium, in a RAM or ROM of a computer, etc. Likewise, this software may be delivered to a user or a device via any known or desired delivery method including, for example, over a communication channel such as a telephone line, the internet, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A diagnostic system for use in a process control network having a plurality of devices communicatively linked over a bus, wherein each of the devices is capable of performing a process control function and of communicating on the bus using scheduled periodic communications to thereby implement a process control scheme during regular operation of the process control network, the diagnostic system comprising:

a diagnostic signal generator disposed in a first one of the devices that generates a diagnostic control signal;

a communicator coupled to the diagnostic signal generator and configured to deliver the diagnostic control signal via the bus to an input of a second one of the devices using the scheduled periodic communications, wherein the second one of the devices is configured to receive a process control signal from a different signal source during regular operation of the process control network; and a signal receiver that receives an output signal developed by another device in response to the diagnostic control signal.

2. The diagnostic system of claim 1, further including a storage unit that stores the received output signal.

3. The diagnostic system of claim 2, further including means for delivering the stored output signal to a third one of the devices capable of performing diagnostic analysis activities using the stored output signal.

4. The diagnostic system of claim 1, wherein the signal receiver includes means for receiving the output signal using the scheduled periodic communications.

5. The diagnostic system of claim 1, wherein the diagnostic control signal is a digital signal and wherein the signal generator includes a memory that stores the digital diagnostic control signal.

6. The diagnostic system of claim 1, further including a control signal input adapted to be coupled to receive the process control signal developed by the different signal source and wherein the communicator includes a switch coupled to the control signal input and the diagnostic signal generator to deliver one of the process control signal or the diagnostic control signal to the second device.

7. The diagnostic system of claim 6, wherein the second device includes the different signal source.

8. The diagnostic system of claim 6, further including a feedback unit that delivers the received output signal to the different signal source.

9. The diagnostic system of claim 8, wherein the feedback unit includes means for delivering the received output signal to the different signal source using the scheduled periodic communications.

10. The diagnostic system of claim 8, wherein the process control function performed by a third process control device associated with the different signal source is capable of operating in different modes and further including a mode handling unit that controls the mode of the process control function within the third device.

11. The diagnostic system of claim 6, further including a process signal receiver adapted to receive one or more process signals and a storage unit that stores the one or more process signals.

12. The diagnostic system of claim 11, further including means for delivering the stored process signals to a further device capable of performing diagnostic analysis activities using the process signals.

13. The diagnostic system of claim 1, wherein the another device is the second device.

14. A diagnostic function block capable of being implemented in a process control device and of being used in a process control network having a plurality of devices communicatively coupled to a bus, wherein each of the devices includes one or more function blocks capable of performing an input function, an output function, or a control function within the process control network and capable of communicating on the bus using scheduled periodic communications to thereby implement a process control scheme during regular operation of the process control network, the diagnostic function block comprising:

a diagnostic signal generator that generates a diagnostic control signal;

a communicator configured to communicate the diagnostic control signal via the bus to a second function block within the process control network using the scheduled periodic communications, wherein the second function block is adapted to receive a process control signal from a third function block during regular operation of the process control network; and a signal receiver that receives an output signal developed by another function block in response to the diagnostic control signal.

15. The diagnostic function block of claim 14, further including a storage unit for storing the received output signal.

16. The diagnostic function block of claim 14, wherein the diagnostic control signal is a digital signal and wherein the diagnostic signal generator includes a memory that stores the digital diagnostic control signal.

17. The diagnostic function block of claim 14, further including a control signal input adapted to be coupled to an output of the third function block using the scheduled periodic communications and a switch coupled to the control signal input and the signal generator for alternatively providing one of the output of the third function block or the diagnostic control signal to the second function block.

18. The diagnostic function block of claim 17, further including a feedback network that delivers the received output signal to the third function block.

19. The diagnostic function block of claim 18, wherein the third function block is capable of operating in different modes and further including a mode handling unit that controls the mode of the third function block when the switch delivers the diagnostic control signal to the second function block.

20. The diagnostic function block of 17, further including a process signal receiver adapted to receive one or more process signals from other function blocks within the process control network and a storage unit that stores the one or more process signals.

21. A method of performing diagnostics in a process control network having a plurality of devices communicatively linked on a bus, wherein each of the devices includes one or more function blocks capable of performing a process control function within the process control network and capable of communicating on the bus using scheduled periodic communications to thereby implement a process control scheme during regular operation of the process control network, the method comprising the steps of:

connecting a first device including a diagnostic function block having a diagnostic signal generator that generates a diagnostic control signal to the bus of the process control network;

communicatively linking an output of the diagnostic function block to a second function block in a second device over the bus using the scheduled periodic communications, wherein the second function block receives a process control signal from a third function block during regular operation of the process control network;

communicatively linking an input of the diagnostic function block to an output of another function block to receive output signals developed by the another function block in response to the diagnostic control signal; and sending the diagnostic control signal to the second function block using the scheduled periodic communications to thereby control operation of the second function block in accordance with the diagnostic control signal.

22. The method of performing diagnostics in a process control network according to claim 21, further including the step of storing the received output signals in the diagnostic function block.

23. The method of performing diagnostics in a process control network according to claim 21, further including the steps of communicatively linking an output of the third function block to a process control signal input of the diagnostic function block and operating the diagnostic function block to switch between a first operating state in which the diagnostic function block sends the output of the third function block to the second function block and a second operating state in which the diagnostic function block sends the diagnostic control signal to the second function block.

24. The method of performing diagnostics in a process control network according to claim 23, further including the step of communicatively linking a feedback output of the diagnostic function block to a feedback input of the third function block to communicate the output signals received from the another function block to the third function block.

25. The method of performing diagnostics in a process control network according to claim 24, further including the step having the diagnostic function block control the mode of operation of the third function block when the diagnostic function block delivers the diagnostic control signal to the second function block.

26. The method of performing diagnostics in a process control network according to claim 24, further including the steps of communicatively linking one or more signal inputs of the diagnostic function block to one or more other function blocks to receive one or more process parameter signals developed by the one or more other function blocks and storing the received one or more process signals in the diagnostic function block.

27. The method of performing diagnostics in a process control network according to claim 26, further including the steps of retrieving the one or more process signals stored in the diagnostic function block and using the retrieved one or more process signals to perform a process diagnostic.

28. The method of performing diagnostics in a process control network according to claim 21, further including the steps storing the output signals in the diagnostic function block, retrieving the output signals stored in the diagnostic function block, and using the retrieved output signals to perform a device diagnostic.

\* \* \* \* \*